(12) United States Patent
Richter et al.

(10) Patent No.: US 9,718,352 B2
(45) Date of Patent: Aug. 1, 2017

(54) SYSTEM AND METHOD FOR MATERIAL TRANSFER AND TRANSPORT

(71) Applicant: General Electric Company, Schenectady, NY (US)

(72) Inventors: Timothy Richter, Niskayuna, NY (US); Herman Wiegman, Niskayuna, NY (US); Irene Berry, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 153 days.

(21) Appl. No.: 14/525,285

(22) Filed: Oct. 28, 2014

(65) Prior Publication Data

US 2016/0114678 A1 Apr. 28, 2016

(51) Int. Cl.

| | |
|---|---|
| *E21C 31/12* | (2006.01) |
| *E21F 13/06* | (2006.01) |
| *E21F 13/08* | (2006.01) |
| *E21F 17/06* | (2006.01) |
| *B60K 1/04* | (2006.01) |
| *B60L 5/00* | (2006.01) |
| *B60K 17/28* | (2006.01) |
| *B60L 11/18* | (2006.01) |

(Continued)

(52) U.S. Cl.
CPC ............... *B60K 17/28* (2013.01); *B60K 1/00* (2013.01); *B60K 1/04* (2013.01); *B60K 17/356* (2013.01); *B60K 23/08* (2013.01); *B60L 5/00* (2013.01); *B60L 11/18* (2013.01); *B60L 11/1809* (2013.01); *E21C 31/12* (2013.01); *E21C 41/16* (2013.01); *E21F 13/063* (2013.01); *E21F 13/08* (2013.01); *E21F 17/06* (2013.01); *B60K 2001/0411* (2013.01); *B60K 2001/0416* (2013.01); *B60Y 2200/41* (2013.01)

(58) Field of Classification Search
CPC .... E21C 31/12; E21F 13/00; E21F 13/06; E21F 13/063; E21F 13/08; E21F 17/04; E21F 17/06; B60L 5/00
USPC ....................................................... 180/207.3
See application file for complete search history.

(56) References Cited

U.S. PATENT DOCUMENTS

| | | | | |
|---|---|---|---|---|
| 2,645,944 A | * | 7/1953 | Crichton, Jr. ........... | E21C 31/12 403/343 |
| 4,087,734 A | | 5/1978 | Blutreich | |

(Continued)

FOREIGN PATENT DOCUMENTS

| | | |
|---|---|---|
| CN | 203047261 | 7/2016 |
| EP | 2669110 | 12/2013 |

OTHER PUBLICATIONS

Veneri eharging infrastructures for EV:Overview of technologies and issues, Electrical Systems for Aircraft, Railway and Ship Propulsion(ESARS), 2012, IEEE, pp. 1-6, Oct. 16-18, 2012.

(Continued)

*Primary Examiner* — David Bagnell
*Assistant Examiner* — Michael Goodwin
(74) *Attorney, Agent, or Firm* — Global Patent Operation; John A. Kramer (57) ABSTRACT

An embodiment of the present invention relates to a system. The system includes a first vehicle, a second vehicle, and an interface between the first vehicle and the second vehicle. The interface is configured to enable the transfer of mechanical power from the second vehicle to the first vehicle when the first vehicle and the second vehicle are stationary.

14 Claims, 4 Drawing Sheets

(51) Int. Cl.
*E21C 41/16* (2006.01)
*B60K 1/00* (2006.01)
*B60K 17/356* (2006.01)
*B60K 23/08* (2006.01)

(56) References Cited

U.S. PATENT DOCUMENTS

| | | | | |
|---|---|---|---|---|
| 4,615,129 | A * | 10/1986 | Jackson | E01H 5/098 126/343.5 R |
| 4,700,023 | A | 10/1987 | Hillmann et al. | |
| 5,003,236 | A * | 3/1991 | Harless | B60K 1/04 180/202 |
| 5,810,134 | A * | 9/1998 | Strack | E21F 17/06 104/93 |
| 6,140,796 | A * | 10/2000 | Martin | H01R 13/60 320/105 |
| 6,636,014 | B1 | 10/2003 | Payne | |
| 7,193,393 | B1 | 3/2007 | Payne | |
| 7,828,270 | B2 | 11/2010 | Duvall | |
| 7,913,782 | B1 * | 3/2011 | Foss | B60D 1/00 180/14.4 |
| 8,421,266 | B2 | 4/2013 | Kumar | |
| 8,428,802 | B2 * | 4/2013 | Kizaki | B60L 9/00 105/35 |
| 8,583,303 | B2 | 11/2013 | Bastien | |
| 2006/0273756 | A1 | 12/2006 | Bowling et al. | |
| 2010/0148567 | A1 * | 6/2010 | McClure | E21C 27/24 299/64 |
| 2011/0301794 | A1 * | 12/2011 | Bastien | E21F 13/00 701/22 |
| 2012/0043172 | A1 | 2/2012 | Ichikawa | |
| 2012/0085458 | A1 * | 4/2012 | Wenzel | A01F 25/14 141/10 |
| 2013/0002198 | A1 | 1/2013 | McCluskey et al. | |
| 2013/0119745 | A1 * | 5/2013 | Zimmerman | E21F 13/00 299/18 |
| 2013/0175973 | A1 | 7/2013 | Jones et al. | |
| 2015/0090554 | A1 * | 4/2015 | Mazumdar | B60L 5/00 191/33 R |
| 2015/0101519 | A1 * | 4/2015 | Blackwell | A01B 59/002 111/200 |
| 2016/0143249 | A1 * | 5/2016 | Peeters | B01F 13/004 241/36 |

OTHER PUBLICATIONS

Parkhideh etal., "Supplementary Energy Storage and Hybrid Front-End Converters for High-Power Mobile Mining Equipment", Industry Applications, IEEE Transactions on, IEEE, vol. No. 49, Issue No. 4, pp. 1863-1872, Apr. 15, 2013.
Non Final Office Action and NORC issued in connection with related U.S. Appl. No. 14/972,887 dated Jun. 23, 2016.
Final Office Action issued in connection with related U.S. Appl. No. 14/972,887 dated Nov. 14, 2016.
U.S. Appl. No. 62/098,810, filed Mar. 31, 2014, Irene Michelle Berry.

\* cited by examiner

SYSTEM AND METHOD FOR MATERIAL TRANSFER AND TRANSPORT

FIELD OF THE INVENTION

Embodiments of the invention relate generally to material transfer and transport. Other embodiments relate to a system and method for transferring and transporting material within a mine.

BACKGROUND OF THE INVENTION

Material movement is a challenging aspect of many industries, particularly in the underground mining industry. Traditional material movement solutions rely on diesel fuel and engines to provide power to mining equipment such as continuous miners and haulers. Emissions, however, are potentially problematic for underground operations, as the heat rejected from the engine and the carbon emissions during operation must be removed from the mine through a ventilation system. Carbon emissions from the utilization of diesel-powered engines also contribute to increased equipment costs because of the provision, regeneration and maintenance of after-treatment filters that are necessary to capture such emissions.

Other material movement solutions rely on electricity to power mining machinery and equipment. For example, continuous miners and haulers may be powered utilizing electricity from external sources. In particular, electrical cables may run from the electrical distribution system within a mine to the miners and haulers to supply power thereto. As will be readily appreciated, however, the electrical distribution system and electrical cables must be installed and advanced with mine development. This installation limits productivity and requires periodic maintenance activities such as cable health assessment and reel operation. In addition, the utilization of electrical cables reduces the flexibility of haul routes, as the cables must not be driven over. Moreover, electrical cables running to the vehicles may be expensive to procure, install and replace, increasing the overall cost of mining operations. Further, establishing and maintaining a reliable connection that provides efficient and safe power transfer can be challenging, especially with vehicles and machinery that are so often in motion.

In view of the above, there is a need for a system and method for powering mining machinery and equipment utilized for material transfer and transport within a mine. In particular, there is a need for a system and method for powering continuous miners and haul vehicles.

BRIEF DESCRIPTION OF THE INVENTION

An embodiment of the present invention relates to a system. The system includes a first vehicle, a second vehicle, and an interface between the first vehicle and the second vehicle. The interface is configured to enable the transfer of mechanical power from the second vehicle to the first vehicle at least when the first vehicle and the second vehicle are stationary.

According to another embodiment, a method is provided. The method includes the steps of linking a first vehicle to a second vehicle through an interface, and transferring mechanical power from the second vehicle to the first vehicle through the interface at least when the first vehicle and the second vehicle are stationary.

According to another embodiment, a driving vehicle comprises a battery, a traction motor electrically connected to the battery, and a first interface portion. The traction motor is configured to convert electrical energy from the battery into a rotational output. The first interface portion is configured to be selectively coupled to a second interface portion of a driven vehicle for transferring mechanical power from the rotational output to the driven vehicle.

In another embodiment, a system comprises a first vehicle, a second vehicle, and an interface between the first vehicle and the second vehicle. The interface comprises an electrical connection between an energy storage device of the first vehicle and the second vehicle and is configured to enable the transfer of electric power from the second vehicle to the energy storage device of the first vehicle.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Reference will be made below in detail to exemplary embodiments of the invention, examples of which are illustrated in the accompanying drawings. Wherever possible, the same reference numerals used throughout the drawings refer to the same or like parts. Although exemplary embodiments of the present invention are described with respect to mining machinery and equipment and, in particular, to continuous loaders and haulers, embodiments of the invention may also be applicable for use with vehicles and machinery generally.

As used herein, "electrical contact," "electrical communication," and "electrically coupled" means that the referenced elements are directly or indirectly connected such that an electrical current may flow from one to the other. The connection may include a direct conductive connection (i.e., without an intervening capacitive, inductive or active element), an inductive connection, a capacitive connection, and/or any other suitable electrical connection. Intervening components may be present. As used herein, "selectively coupled" means that a component may be coupled to another component in one mode of operation, and decoupled with the other component in another mode of operation.

Embodiments of the invention relate to a system. The system includes a first vehicle, a second vehicle, and an interface between the first vehicle and the second vehicle. The interface is configured to enable the transfer of power from the second vehicle to the first vehicle. For example, the interface may be configured to enable the transfer of mechanical power from the second vehicle to the first vehicle at least when the first vehicle and the second vehicle are stationary. That is, in at least one mode of operation of the first vehicle and second vehicle, the second vehicle is configured to transfer mechanical power to the first vehicle when neither the first vehicle nor the second vehicle is moving from location to location.

Other embodiments relate to a method. The method includes the steps of linking a first vehicle to a second vehicle through an interface, and transferring power from the second vehicle to the first vehicle through the interface. For example, the method may comprise transferring mechanical power from the second vehicle to the first vehicle through the interface at least when the first vehicle and the second vehicle are stationary.

Yet other embodiments relate to a driving vehicle. The driving vehicle includes a battery, a traction motor electrically connected to the battery, and a first interface portion. The traction motor is configured to convert electrical energy from the battery into a rotational output. The first interface portion is configured to be selectively coupled to a second interface portion of a driven vehicle for powering the driven vehicle. For example, the first interface portion may be configured to be selectively coupled to the second interface portion for transferring mechanical power from the rotational output to the driven vehicle.

In any of the embodiments, the interface may be used in conjunction with a method wherein a driven vehicle is stationed at a load point or other work location, but receives mechanical power or other power from a driving vehicle for performing a work task. Thus, the driven vehicle and the driving vehicle are moved to the work location, a first interface portion of the driving vehicle is coupled to a second interface portion of the driven vehicle, and mechanical power or other power is transferred from the driving vehicle to the driven vehicle, for performing the work task. For example, in one embodiment, a system comprises a loader (driven vehicle) and one or more haulers (each a driving vehicle configured as described herein). Each time one of the haulers arrives at the loader to receive a load of material, the hauler is coupled to the loader to mechanically or otherwise power the loader for the loading operation. This reduces the on-board power requirements of the loader, for example, the loader may have sufficient on-board power for movement from one location to another (e.g., battery power), but does not need on-board power sufficient for the loading operations.

Figure 1:
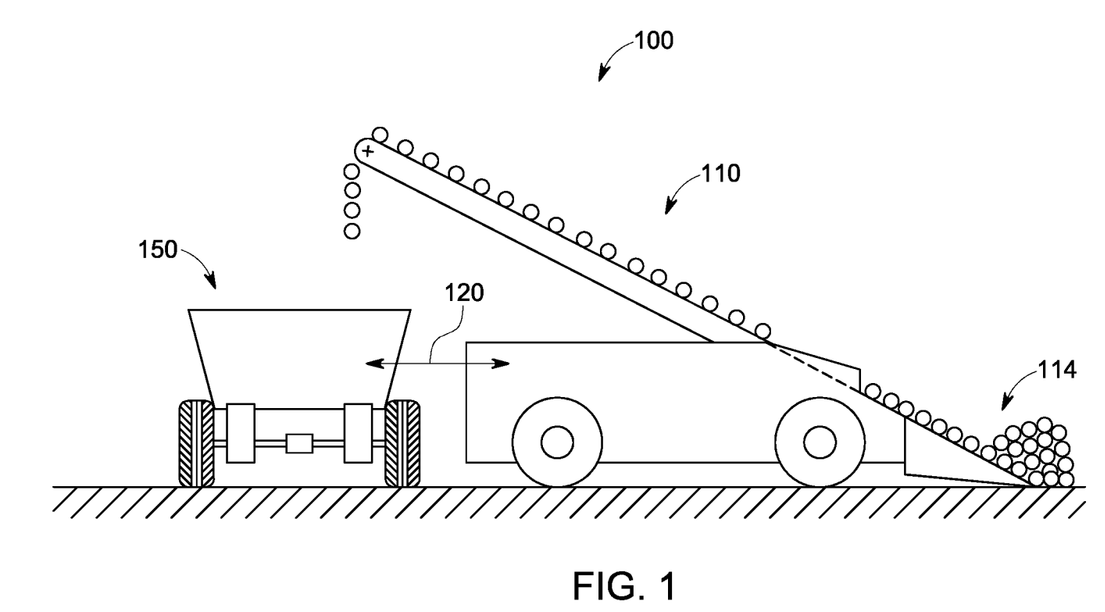
FIG. 1 is a schematic view of a system for material transfer and transport, according to an embodiment of the invention.

With reference to FIG. 1, a system 100 for material transfer and transport is illustrated. As shown therein, the system 100 includes a first, driven vehicle or other driven work machine, such as continuous miner 110, and a second, battery-powered driving vehicle or other work machine, such as hauler 150, mechanically and/or electrically connected to the first work machine through an interface 120. As used herein, "work machine" means a machine configured to utilize power, such as electrical or mechanical power to perform a task and may include non-motive and motive machines. In an embodiment, as indicated above, the first and second work machines are first and second vehicles. In an embodiment, each of the vehicles may be capable, in at least one mode of operation, of self-propulsion (e.g., each vehicle includes a respective on-board engine, battery, and/or other energy source for driving on-board traction motors and/or a mechanical drivetrain to move the vehicle from one location to another without the assistance of other vehicles). As also used herein, "driving work machine" or "driving vehicle" means a machine (e.g., vehicle) that is configured to provide or transfer power to another machine. In connection with this, as used herein, "driven work machine" or "driven vehicle" means a machine (e.g., vehicle) that is configured to receive power from a driving machine (e.g., driving vehicle) to perform a task.

Figure 2:
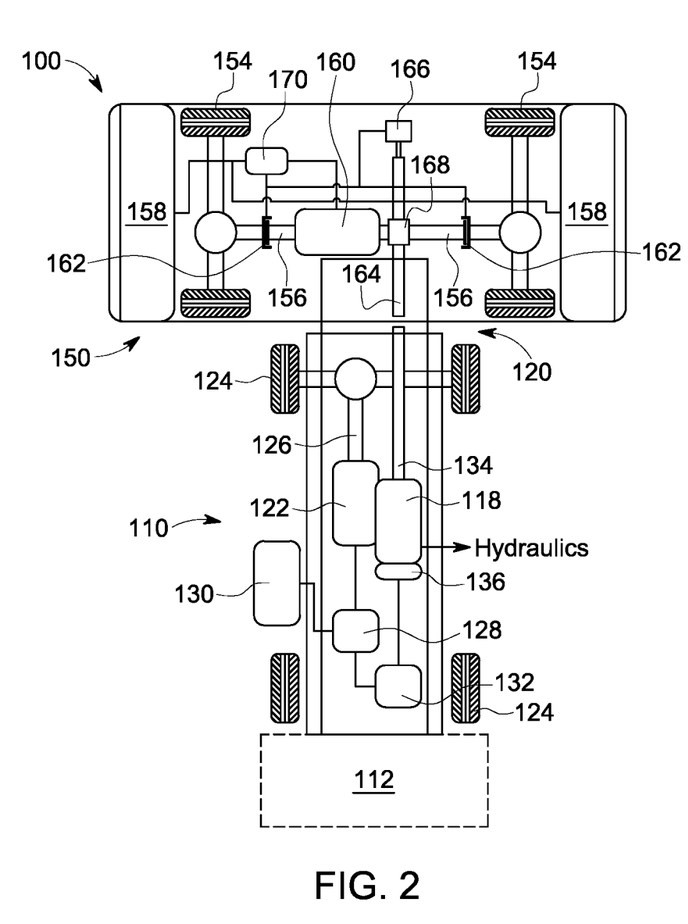
FIG. 2 is another schematic view of the system of FIG. 1, illustrating the internal components of a first vehicle and a second vehicle of the system.
Figure 3:
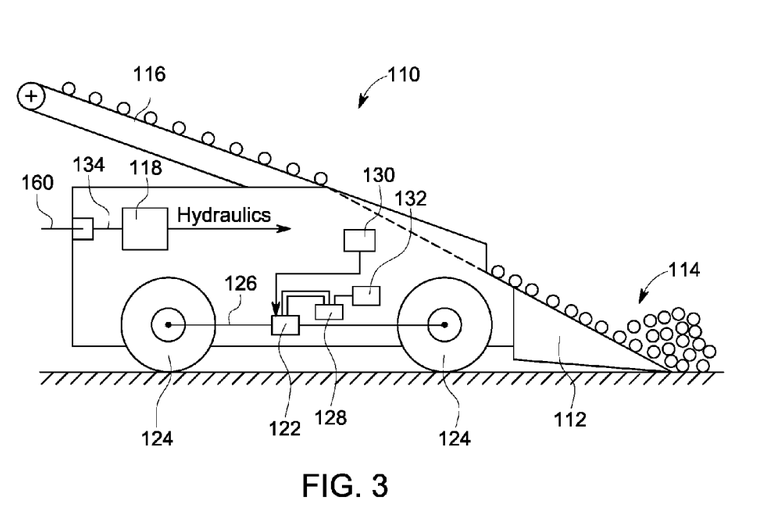
FIG. 3 is a side elevational view of the first vehicle of FIG. 2.

Turning to FIGS. 2 and 3, the continuous miner 110 may include a cutting head (not shown) configured to cut into the exposed face of a mine under the control of an operator, a scoop 112 configured to receive material 114 after it has been cut from the mine by the cutting head, and a conveyor 116 configured to transfer the material from the scoop 112 to a haul vehicle, such as hauler 150, so that it may be removed from the mine. A hydraulic pump 118 provides a mechanical source of power for a hydraulic assembly that may be selectively operated to raise and lower the cutting head.

The continuous miner 110 may also include a traction motor 122 coupled to the wheels 124 of the miner 110 via a drive shaft 126 for propelling the miner 110 under direction of an on-board control unit 128. An operator control panel or interface 130 electrically coupled to the control unit 128 provides a means for an operator to manually or remotely control operation of the miner 110 from a safe distance from the exposed face of the mine. In an embodiment, the miner 110 also includes an energy storage device, such as battery 132, which is electrically connected to the traction motor 122. The traction motor 122 is configured to receive electrical energy from the battery 132 and convert the electrical energy to a mechanical output to rotate the drive shaft 126, and thus the wheels 124, to selectively move the miner 110 from one location to another within a mine, as discussed in detail hereinafter.

As further shown in FIGS. 2 and 3, the continuous miner 110 includes a power receiver shaft 134 configured for operative coupling with a power transfer shaft 164 of a corresponding haul vehicle, as discussed below. In an embodiment, the power receiver shaft 134 is configured to drive the hydraulic pump 118 as well as an on-board alternator/generator 136 electrically coupled to the battery 132. The alternator/generator 136 is configured to convert the mechanical energy received by power receiver shaft 134 into electrical energy for storage in the battery 132.

Figure 4:
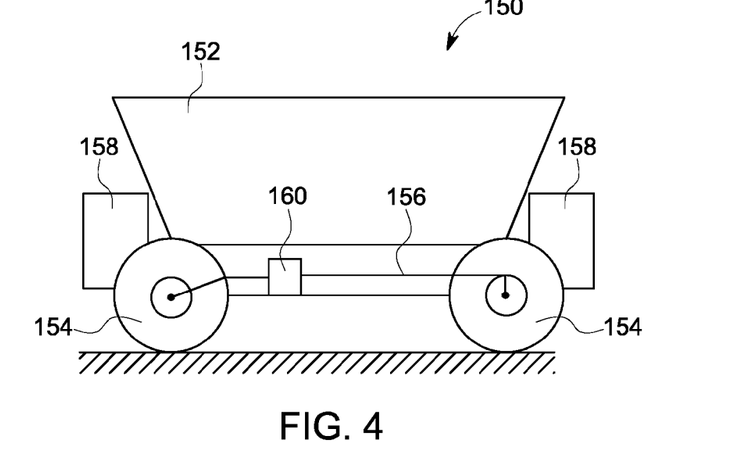
FIG. 4 is a side elevational view of the second vehicle of FIG. 2.
Figure 5:
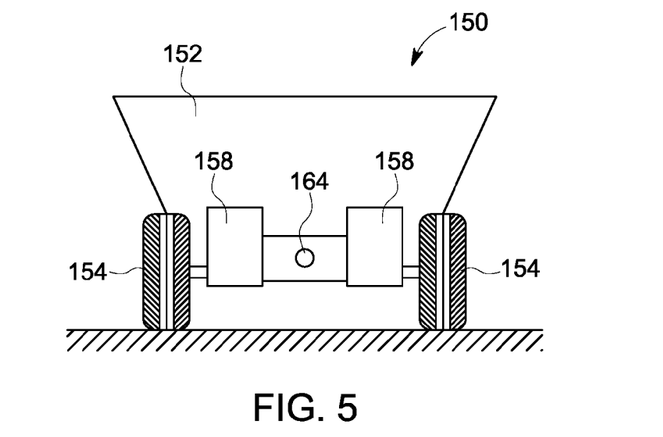
FIG. 5 is a front elevational view of the second vehicle of FIG. 2, according to another embodiment of the invention.

Referring now to FIGS. 2, 4 and 5, the hauler 150 includes a bed 152, a frame (not shown) supporting the bed 152, and a plurality of wheels 154 connected to a drive shaft 156. The hauler 150 also includes a traction motor 160 and at least one energy storage device, such as a battery or batteries 158, electrically connected to the traction motor 160. The traction motor 160 is configured to receive stored electrical energy from the battery 158 and to convert the electrical energy to mechanical energy in order to rotate the drive shaft 156 to drive the wheels 154 to propel the hauler 150. As best shown in FIG. 2, the hauler 150 may include clutches 162 that are configured to selectively permit the transfer of power from the traction motor 160 to the wheels 154.

In an embodiment, the hauler 150 includes a power transfer shaft 164 configured for operative coupling to the power receiver shaft 134 of the continuous miner 110. An actuator 166 and gearbox 168, in addition to the clutches 162, are utilized to selectively drive the drive shaft 156 and/or the power transfer shaft 164 under the control of an on-board control unit 170. In particular, as shown in FIG. 2, the control unit 170 is electrically connected to the batteries 158, the clutches 162, the traction motor 160, and the actuator 166. In this manner, the control unit 170 functions to selectively control the mechanical output of the traction motor 160 to rotate the drive shaft 156 to propel the hauler 150 from location to location, or the power transfer shaft 164 to power operation of the continuous miner 110, in the manner discussed in detail hereinafter.

In connection with the above, the hauler 150 may be a battery-powered vehicle having the power transfer shaft 164 protruding from one side thereof. The battery 158 is configured to supply stored electrical energy to the traction motor 160. In a first mode of operation, the traction motor 160 rotates the drive shaft 156 to provide motive power to the wheels 154 of the hauler 150 to move the hauler 150 from one location to another, such as between a loading position adjacent to the continuous miner 110 and a tipping point. In a second mode of operation, the haul vehicle remains stationary and the traction motor 160 rotates only the power transfer shaft 164 to provide a mechanical output that may be utilized to power another machine or equipment, such as continuous miner 110.

In particular, the power receiver shaft 134 of the continuous miner 110 may be selectively coupled to the power transfer shaft 164 of the hauler 150 so that mechanical output of the power transfer shaft 164 is transferred to the power receiver shaft 134. As discussed above, when the power transfer shaft 164 (first interface portion) and power receiver shaft 134 (second interface portion) are coupled so as to form the interface 120, operation of the traction motor 160 in the second mode of operation transfers power to the continuous miner 110. In an embodiment, as discussed above, the hauler 150 (via the interface 120) provides a mechanical input to the hydraulic pump 118 of the miner 110, thereby powering the hydraulic system that is utilized to control the cutting head and other mechanical devices of the miner 110 utilized in mining operations. In addition, the hauler 150 provides a mechanical input to the alternator/generator 136 of the miner 110, where the mechanical energy is converted to electrical energy that is supplied to battery 132 for storage. In an embodiment, the battery 132 may then be controlled by the control unit 128 to provide electrical energy to the traction motor 122, which provides motive power to the wheels 124 to move the continuous miner 110 from location to location within a mine, as necessary.

In connection with the above, a method for material transfer and transport within a mine utilizing the system 100 of the present invention is provided. In an embodiment, the continuous miner 110 is trammed to a loading point within a mine utilizing power from the on-board battery 132. Hauler 150 is then trammed to the load point behind the continuous miner 110 utilizing its own on-board battery 158. The power transfer shaft 164 of the hauler 150 is coupled to the power receiver shaft 134 of the continuous miner, such that interface 120 is established. With both vehicles stationary (that is, not moving from one location to another), the interface 120 allows power from the hauler 150 to be transferred to the miner 110 such that power from the hauler 150 operates the miner 110 (and the cutting head, scoop and conveyor thereof) to remove material 114 from a seam within the mine. The material 114, once cut from the wall of the mine, is presented to the scoop 112 of the miner 110, and then transferred to the conveyor 116 and ultimately to the bed 152 of the hauler 150. When the bed 152 is full, the hauler 150 is then disconnected from the miner 110, breaking the interface 120, and trams to a tipping point to unload the material 114 under power from the batteries 158. In an embodiment, the hauler 150 may have an integral weight-sensing system that determines when the bed is full. When the bed is full, the control unit 170 of the hauler 150 may automatically stop operation of the miner 110 by breaking the connection between miner 110 and hauler 150 and/or sending a signal to the control unit of the 128 of the miner 110 to halt operation.

In an embodiment, both the hauler 150 and the miner 110 may be outfitted with wireless communications devices or other communication means for establishing a communications link between the vehicles. This communications link is configured to allow an operator of the hauler 150 to control operation of the miner 110, and/or vice versa. For example, the communications link allows an operator of the hauler 150 to control operation of the miner 150 from the hauler 150.

In an embodiment, the batteries 158 of the hauler 150 may be recharged utilizing electrical or mechanical power transfer. In an embodiment, the hauler 150 may be recharged through the same method as power transfer to the miner 110. In an embodiment, the hauler 150 may be recharged utilizing battery charging systems deployed within the mine installation. In an embodiment, the hauler 150 may be recharged every haul cycle. In other embodiments, the hauler 150 may have removable batteries than may be swapped out for recharging rather than connecting the hauler 150 directly to a battery charging system/station.

In an embodiment, the interface 120 may be a swivel spline coupling. While the system and method described above disclose that power is transferred from the hauler 150 to miner 110 via a mechanical connection, it is also contemplated that power be transferred from the hauler 150 to the miner 110 via an electrical connection. In particular, in lieu of the power transfer shaft 164 and power receiver shaft 134, the hauler 150 and miner 110 may be outfitted with electrical cables configured for selective connection within one another to form interface 120 so that electrical power can be transferred between the machines.

In particular, while the present invention has been heretofore described as a system that provides an mechanical connection between a haul vehicle and a loading vehicle so that power may be transferred from one vehicle to the other to sustain operation of one of the vehicles over a totality or a portion of its operating cycle, the present invention is not intended to be so limited in this regard. In particular, it is contemplated that the coupling between the vehicles may be conductive, magnetic, electrical and/or hydraulic in addition to, or in lieu of, the mechanical coupling.

In addition, while embodiments of the present invention have been described in connection with a single hauling vehicle and a single loading vehicle, the present invention is equally applicable to a fleet of hauling vehicle and a fleet of loading vehicles. For example, one or more hauling vehicles of the present invention may be configured to interface with a fleet of loading vehicles positioned within a mine to conducting mining operations throughout the mine.

As will be readily appreciated, by providing battery powered vehicles and mining machinery and, in particular, battery powered machines that are capable of powering other machinery, the need to install and maintain an expansive power distribution system within a mine and to run dedicated electrical cables to each piece of mining equipment may be substantially reduced or eliminated. Indeed, the power distribution network for a mine may now be simplified by concentrating the power connection to the mine into high-power battery chargers that can be located in a clean and accessible environment along the haul routes. In an embodiment, the location of the chargers can be shared by multiple haul routes, increasing the utilizing of charging equipment. As a result, power distribution in mine drifts and surface electrical cables can be reduced or eliminated.

Another technical advantage of the system of the present invention is the use of mechanical power transfer to improve the speed, simplicity and cost of charging and power transfer to the continuous miner 110.

In addition to the above, the system of the present invention increases safety within a mine installation. High voltage systems require strict attention to LOTO (lockout-tagout) procedures and can increase the amount of training required for technicians and workers. As will be readily appreciated, therefore, the use of a low voltage (24/48V) material handling propulsion system for the continuous miners may be desirable. This isolates the high voltage to only the hauler, making drift access for hang-up removal miner maintenance easier. Haulers can easily be trammed to a work area outside of the haul route where specialized equipment and trained personnel can perform maintenance in a controlled, well-lit environment.

Moreover, by providing a hauler vehicle and continuous miner that run solely on electrical power, traditional vehicles utilizing diesel fuel may be phased out. Accordingly, the elimination of diesel emissions reduces the energy requirement for ventilation and eliminates diesel particulate matter pollution.

An embodiment of the invention relates to a system. The system includes a first vehicle, a second vehicle, and an interface between the first vehicle and the second vehicle. The interface is configured to enable the transfer of power from the second vehicle to the first vehicle.

In an embodiment, the interface is an electrical connection between an energy storage device of the first vehicle and the second vehicle, and the power is electric power.

In another embodiment, the interface is configured to enable the transfer of mechanical power from the second vehicle to the first vehicle at least when the first vehicle and the second vehicle are stationary.

For example, in an embodiment, the first vehicle includes a power receiver shaft, and the second vehicle includes a power transfer shaft configured to be selectively coupled to the power receiver shaft of the first vehicle to form the interface, a battery providing a supply of electrical energy, and a traction motor electrically connected to the battery and configured to selectively drive the power transfer shaft.

In an embodiment, the power receiver shaft is operatively connected to at least one of a hydraulic system and/or an alternator of the first vehicle.

In an embodiment, the first vehicle includes a first vehicle battery electrically connected to the alternator and a first vehicle traction motor electrically connected to the first vehicle battery, wherein the first vehicle traction motor is configured to provide motive power to wheels of the first vehicle.

In an embodiment, the second vehicle is operable in a first mode and a second mode. In the first mode, the traction motor rotates a drive shaft of the second vehicle to provide motive power to wheels of the second vehicle to move the second vehicle from a first location to a second location. In the second mode, the traction motor rotates the power transfer shaft to provide a mechanical output to power the first vehicle.

In an embodiment, the power transfer shaft is configured for coupling to a charging device for charging the battery of the second vehicle.

In an embodiment, the first vehicle is a continuous miner and the second vehicle is a battery-powered haul vehicle.

According to another embodiment, a method is provided. The method includes the steps of linking a first vehicle to a second vehicle through an interface, and transferring power from the second vehicle to the first vehicle through the interface.

In an embodiment, the first vehicle is a continuous miner having a first energy storage device and a first traction motor electrically connected to the first energy storage device, and the second vehicle is a haul vehicle having a second energy storage device and a second traction motor electrically connected to the second energy storage device. The method may include the steps of, prior to linking, moving the continuous miner to a load point within a mine via power from the first energy storage device and moving the haul vehicle to the load point behind the continuous miner via power from the second energy storage device.

In an embodiment, the interface is an electrical connection between an energy storage device of the first vehicle and the second vehicle and the power is electric power.

In another embodiment, the interface is a mechanical interface configured for the second vehicle to transfer mechanical power to the first vehicle at least when the first vehicle and the second vehicle are stationary.

For example, in an embodiment, the first vehicle includes a power receiver shaft, and the second vehicle includes a power transfer shaft configured to be selectively coupled to the power receiver shaft of the first vehicle to form the interface, an energy storage device providing a supply of electrical energy, and a traction motor electrically connected to the energy storage device and configured to selectively drive the power transfer shaft to transfer the power to the power receiver shaft of the first vehicle.

In an embodiment, the method may include the steps of, in a first mode, moving the second vehicle from a first location to a second location by controlling the traction motor to rotate a drive shaft of the second vehicle to provide motive power to wheels of the second vehicle and, in a second mode, controlling the traction motor to rotate the power transfer shaft to provide a mechanical output to power the first vehicle.

In an embodiment, the method may include the step of driving a hydraulic pump of the first vehicle with an output of the power receiver shaft when the first vehicle is linked to the second vehicle.

In an embodiment, the method may include the steps of converting the mechanical output of the power receiver shaft to electrical energy using an alternator of the first vehicle, and storing the electrical energy in a battery of the first vehicle.

According to yet another embodiment, a driving vehicle is provided. The driving vehicle includes a battery, a traction motor electrically connected to the battery, and a first interface portion configured to be selectively coupled to a second interface portion of a driven vehicle for powering the driven vehicle. The traction motor is configured to convert electrical energy from the battery into a rotational output.

In an embodiment, the first interface portion is configured to be selectively coupled to the second interface portion of a driven vehicle for transferring mechanical power from the rotational output to the driven vehicle. For example, in an embodiment, the first interface portion is a power transfer shaft driven by the traction motor of the driving vehicle and the second interface portion is a power receiver shaft of the driven vehicle.

In an embodiment, the first interface portion is a first electrical cable electrically connected to the battery of the driving vehicle and the second interface portion is a second electrical cable of the driven vehicle.

In an embodiment, the driving vehicle is a mine haul vehicle.

In an embodiment, the driving vehicle is operable in a first mode and a second mode. In the first mode, the traction motor rotates a drive shaft of the driving vehicle to provide motive power to wheels of the driving vehicle to move the driving vehicle from a first location to a second location. In the second mode, the traction motor rotates the power transfer shaft to provide a mechanical output to power the driven vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The terms "including" and "in which" are used as the plain-English equivalents of the respective terms "comprising" and "wherein." Moreover, the terms "first," "second," "third," "upper," "lower," "bottom," "top," etc. are used merely as labels, and are not intended to impose numerical or positional requirements on their objects.

This written description uses examples to disclose several embodiments of the invention, including the best mode, and also to enable one of ordinary skill in the art to practice the embodiments of invention, including making and using any devices or systems and performing any incorporated methods.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the embodiments described herein without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system, comprising:
    a first vehicle configured for self-propulsion;
    a second vehicle configured for self-propulsion; and
    an interface between the first vehicle and the second vehicle, the interface being configured to enable the transfer of mechanical power from the second vehicle to the first vehicle at least when the first vehicle and the second vehicle are stationary, wherein:
    the first vehicle includes a power receiver shaft that is operatively connected to an alternator of the first vehicle;
    the second vehicle includes a power transfer shaft configured to be selectively coupled to the power receiver shaft of the first vehicle to form the interface, a battery configured to provide a supply of electrical energy, and a traction motor electrically connected to the battery and configured to selectively drive the power transfer shaft
    the first vehicle includes a first vehicle battery electrically connected to the alternator and a first vehicle traction motor electrically connected to the first vehicle battery; and
    the first vehicle traction motor is configured to provide motive power to wheels of the first vehicle.

2. The system of claim 1, wherein:
    the second vehicle is operable in a first mode and a second mode;
    wherein in the first mode, the traction motor of the second vehicle is configured to rotate a drive shaft of the second vehicle to provide motive power to wheels of the second vehicle to move the second vehicle from a first location to a second location; and
    wherein in the second mode, the traction motor of the second vehicle is configured to rotate the power transfer shaft to transfer the mechanical power to the first vehicle.

3. The system of claim 1, wherein:
    the power transfer shaft is configured for coupling to a charging device for charging the battery of the second vehicle.

4. The system of claim 1, wherein:
    the first vehicle is a continuous miner; and
    the second vehicle is a battery-powered haul vehicle.

5. A method, comprising the steps of:
    linking a first vehicle to a second vehicle through an interface; and
    transferring mechanical power from the second vehicle to the first vehicle through the interface at least when the first vehicle and the second vehicle are stationary;
    wherein each of the first vehicle and the second vehicle is configured for self-propulsion;
    wherein the first vehicle includes a power receiver shaft;
    wherein the second vehicle includes a power transfer shaft configured to be selectively coupled to the power receiver shaft of the first vehicle to form the interface, an energy storage device providing a supply of electrical energy, and a traction motor electrically connected to the energy storage device and configured to selectively drive the power transfer shaft to transfer the mechanical power to the power receiver shaft of the first vehicle; and
    wherein the method further comprises driving a hydraulic pump of the first vehicle with an output of the power receiver shaft when the first vehicle is linked to the second vehicle.

6. The method according to claim 5, wherein:
    the first vehicle is a continuous miner having a first energy storage device and a first traction motor electrically connected to the first energy storage device, and the second vehicle is a haul vehicle; and
    wherein the method further includes the steps of, prior to linking, moving the continuous miner to a load point within a mine via power from the first energy storage device and moving the haul vehicle to the load point behind the continuous miner via power from the energy storage device of the haul vehicle.

7. The method according to claim 5, further comprising the steps of:
    in a first mode, moving the second vehicle from a first location to a second location by controlling the traction motor to rotate a drive shaft of the second vehicle to provide motive power to wheels of the second vehicle; and in a second mode, controlling the traction motor to rotate the power transfer shaft to transfer the mechanical power to the first vehicle.

8. A method comprising:

linking a first vehicle to a second vehicle through an interface; and transferring mechanical power from the second vehicle to the first vehicle through the interface at least when the first vehicle and the second vehicle are stationary, wherein each of the first vehicle and the second vehicle is configured for self-propulsion, wherein the first vehicle includes a power receiver shaft, and wherein the second vehicle includes a power transfer shaft configured to be selectively coupled to the power receiver shaft of the first vehicle to form the interface, an energy storage device providing a supply of electrical energy, and a traction motor electrically connected to the energy storage device and configured to selectively drive the power transfer shaft to transfer the mechanical power to the power receiver shaft of the first vehicle;

converting the mechanical output of the power receiver shaft to electrical energy using an alternator of the first vehicle; and storing the electrical energy in a battery of the first vehicle.

9. A system, comprising:

a first vehicle;

a second vehicle; and an interface between the first vehicle and the second vehicle, the interface being an electrical connection between an energy storage device of the first vehicle and the second vehicle, the interface being configured to enable the transfer of electric power from the second vehicle to the energy storage device of the first vehicle;

wherein at least one of the first vehicle and second vehicle is configured to disable the transfer of electric power when a weight of the second vehicle exceeds a threshold value.

10. A method comprising:

linking a first vehicle to a second vehicle through an interface;

transferring mechanical power from the second vehicle to the first vehicle through the interface at least when the first vehicle and the second vehicle are stationary, wherein each of the first vehicle and the second vehicle is configured for self-propulsion; and with a control unit on-board the second vehicle, ceasing the transferring of mechanical power from the second vehicle to the first vehicle when a weight carried by the second vehicle reaches a threshold weight.

11. The method of claim 10, wherein:

the first vehicle is a continuous miner having a first energy storage device and a first traction motor electrically connected to the first energy storage device, and the second vehicle is a haul vehicle having a second energy storage device and a second traction motor electrically connected to the second energy storage device; and the method further includes the steps of, prior to linking, moving the continuous miner to a load point within a mine via power from the first energy storage device and moving the haul vehicle to the load point behind the continuous miner via power from the second energy storage device.

12. The method of claim 10, further comprising:

in a first mode, moving the second vehicle from a first location to a second location by controlling a traction motor of the second vehicle to rotate a drive shaft of the second vehicle to provide motive power to wheels of the second vehicle; and in a second mode, controlling the traction motor to rotate a power transfer shaft to transfer the mechanical power to the first vehicle.

13. The method of claim 10, wherein:

the first vehicle includes a power receiver shaft;

the second vehicle includes a power transfer shaft configured to be selectively coupled to the power receiver shaft of the first vehicle to form the interface, an energy storage device providing a supply of electrical energy, and a traction motor electrically connected to the energy storage device and configured to selectively drive the power transfer shaft to transfer the mechanical power to the power receiver shaft of the first vehicle; and the method further comprises driving a hydraulic pump of the first vehicle with an output of the power receiver shaft when the first vehicle is linked to the second vehicle.

14. The method of claim 10, further comprising:

converting the mechanical power received at the first vehicle to electrical energy using an alternator of the first vehicle; and storing the electrical energy in a battery of the first vehicle.

* * * * *